United States Patent

[11] 3,542,049

[72] Inventors Tomoomi Kobayashi;
Norio Maejima; Kazuo Ozawa; Hayao Nishino, Kyoto, Japan
[21] Appl. No. 743,433
[22] Filed July 9, 1968
[45] Patented Nov. 24, 1970
[73] Assignee Omron Tateisi Electronics Co.
Ukyo-ku, Kyoto, Japan
a company of Japan
[32] Priority July 11, 1967
[33] Japan
[31] No. 42/44830

[54] PROXIMITY DETECTOR

3 Claims, 4 Drawing Figs.

[52] U.S. Cl. 137/81.5
[51] Int. Cl. F15c 1/10, F15c 4/00
[50] Field of Search 137/81.5; 73/61.1, 37.5, 37.7; 235/201gen, p.f., sens., m.e., 200gen., and., p.f.

[56] References Cited

UNITED STATES PATENTS

| | | | |
|---|---|---|---|
| 3,158,166 | 11/1964 | Warren | 137/81.5 |
| 3,185,166 | 5/1965 | Horton et al. | 137/81.5 |
| 3,217,727 | 11/1965 | Spyropoulos | 137/81.5 |
| 3,226,530 | 12/1965 | Greenblott et al. | 137/81.5X |
| 3,232,095 | 2/1966 | Symnoski et al. | 137/81.5X |
| 3,258,023 | 6/1966 | Bowles | 137/81.5 |
| 3,270,960 | 9/1966 | Phillips | 137/81.5X |
| 3,302,398 | 2/1967 | Taplin et al. | 137/81.5X |
| 3,396,619 | 8/1968 | Bowles et al. | 137/81.5X |

*Primary Examiner*—Samuel Scott
*Attorney*—Christensen, Sanborn & Matthews

ABSTRACT: A proximity detector comprising at least one pure fluid or fluidic oscillator by the changes in the oscillating output condition of which the presence or absence of an object is detected. The fluidic oscillator includes a feedback channel and an object detecting aperture communicating the feedback channel with an environment. While the feedback channel communicates with an environment through the aperture, it cannot perform its feedback function so that the oscillator cannot start oscillation. When an object has closed the aperture, the feedback function of the feedback channel is restored, so that the oscillator starts oscillation. When the object leaves the aperture open, the feedback channel loses its function, so that the oscillation stops. Thus, by the changes in the oscillating output condition of the oscillator it is possible to detect the presence or absence of an object at the aperture.

Patented Nov. 24, 1970 3,542,049

Figure 1:
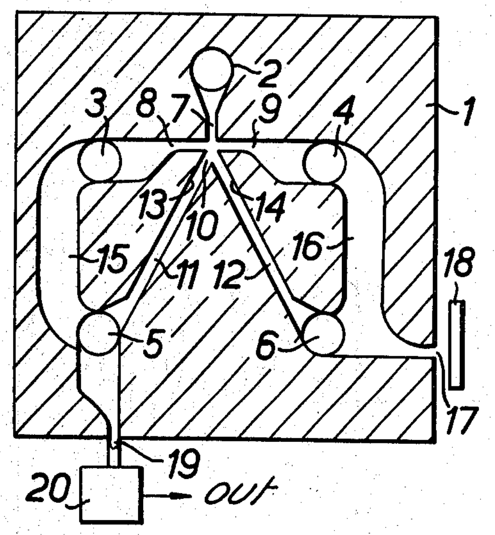

INVENTORS.-
TOMOOMI KOBAYASHI
NORIO MAEJIMA
KAZUO OZAWA
HAYAO NISHINO
BY Christensen, Sanborn & Matthews
ATTORNEYS

PROXIMITY DETECTOR

This invention relates to a proximity detector and more particularly to a device for detecting objects, which employs pure fluid or fluidic elements.

There are known many proximity detectors of electric or magnetic type. Such detectors have an electric or magnetic field and are arranged to produce an output signal when the field is disturbed by any object capable of disturbing such a field, so that it is possible to detect the presence or absence of an object in the field by the presence or absence of the output signal from the detectors. There are also known many proximity detectors which utilize light or supersonic waves in such a manner that when any object interrupts the light or supersonic waves entering a suitable sensor, an output signal is produced, by which the object can be detected.

Such prior art detectors, however, have various defects such as follows: The electric or magnetic field is apt to be influenced by ambient conditions, with resulting deterioration of the accuracy of the detecting operation of the detectors. In the optical or supersonic type, any stray light or supersonic waves entering the detectors may well cause an erroneous operation of the detectors. Moreover, the prior art detectors are complicated in construction, difficult in installation and operation, and are apt to be affected by various ambient conditions.

Accordingly, it is one object of the invention to provide a proximity detector which comprises a fluidic element.

Another object of the invention is to provide a proximity detector which employs a fluidic oscillator, the oscillating output condition of which is adapted to be changed by an object to be detected.

Another object of the invention is to provide a proximity detector which utilizes a fluidic oscillator, the feedback condition of which is adapted to be changed by an object to be detected.

The proximity detector constructed in accordance with the invention employs a fluidic oscillator including a feedback channel and an object detecting aperture communicating the feedback channel with an environment and adapted to be closed by an object to be detected. So long as the object detecting aperture is kept open, the feedback channel cannot perform its feedback function, so that the oscillator cannot start oscillation. When the aperture has been closed by an object, the feedback function is restored, so that the oscillator starts oscillation. Therefore, by the presence or absence of the oscillating fluid output it is possible to detect the presence or absence of an object closing the object detecting aperture.

Still another object of the invention is to provide a proximity detector which employs a plurality of fluidic oscillators to enable detection of holes and the like formed in a relatively thin object, for example, the punched holes of a card used in various credit sales systems.

As is well known, fluidic elements include no mechanical moving parts whatsoever and are very simple in construction, reliable in operation, highly resistive to impacts and/or vibrations and unlikely to be affected by ambient conditions. Being composed of such a fluidic element, the device of the invention can enjoy the same advantages, and employing a fluidic oscillator the device has a high degree of sensitivity and is quick in response.

Figure 3:
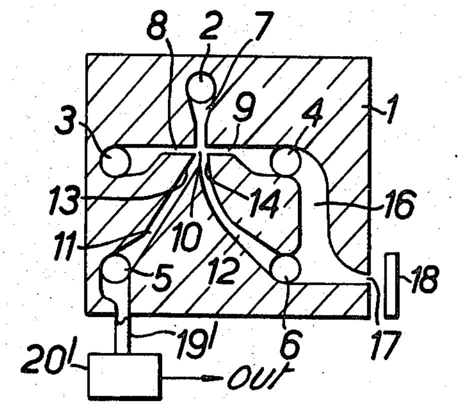
Figure 2:
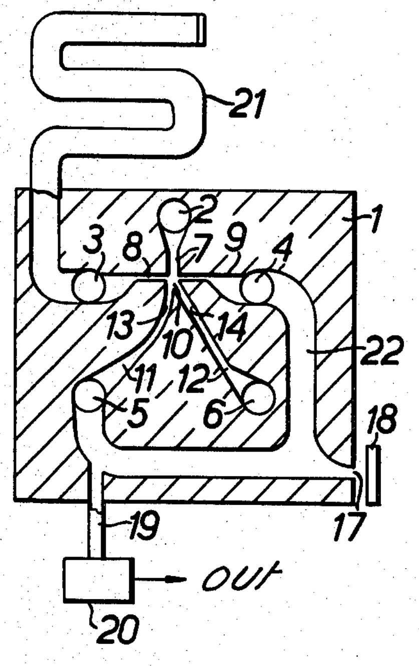
Figure 4:
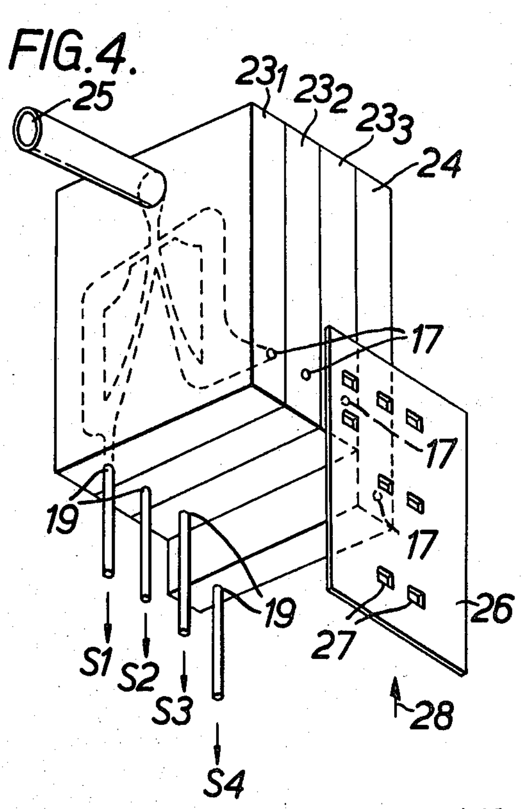

The invention, with its above stated and other objects, features advantages, will become apparent from the following detailed description of preferred embodiments thereof with reference to the accompanying drawings, wherein:

FIG. 1 schematically shows the structure of one embodiment of the invention;

FIG. 2 schematically shows the construction of another embodiment of the invention;

FIG. 3 schematically shows the structure of a third embodiment of the invention; and FIG. 4 is a somewhat schematic, perspective bottom view of a cardreader utilizing a plurality of fluidic oscillators as shown in FIG. 1.

Referring now in detail to the drawings, first to FIG. 1, there is shown a proximity detector chiefly comprising a fluidic oscillator generally designated by 1. The oscillator 1 includes a supply port 2, a pair of control ports 3 and 4 and a pair of output ports 5 and 6. Although not shown, a source of fluid, such as air, water or the like, is connected to the supply port 2. A power nozzle 7 communicates with the supply port 2 on the one hand and opens toward an interaction chamber 10, on the other, to issue into the chamber 10 a power stream of the fluid supplied through the port 2. A pair of control nozzles 8 and 9 communicating with the control ports 3 and 4, respectively, open toward the interaction chamber 10 at the opposite sides thereof and at a substantially right angle with respect to the power nozzle 10. A pair of output channels 11 and 12 communicate the chamber 10 with the output ports 5 and 6, respectively. The chamber 10 is of such a configuration that the well known fluidic operation is effected. That is, when the power stream issuing from the power nozzle 7 coincides in the chamber 10 with the control stream issuing from the control nozzle 8, the two streams interact so that due to the well known Coanda effect the power stream is deflected toward a sidewall 14, attaching thereto and entering the output channel 12. Under the condition if the opposite control nozzle 9 issues a control stream, the power stream shifts to the other output channel 11, attaching to the opposite sidewall 13.

The output port 5 is connected back to the control port 3 by a feedback channel 15, and the output port 6, to the control port 4 via a feedback channel 16. When both channels 15 and 16 alternately perform their respective feedback function, the power stream is alternately shifted from one of the two output channels 11 and 12 to the other, thereby providing a fluidic oscillation.

The characteristic of the invention is that one of the feedback channels, say, 16 communicates with an environment through an aperture 17, and that an object to be detected can be detected by positioning the object so as to close the aperture 17. When an object 18 blocks the aperture 17, the condition is the same as if there were no such aperture, so that the feedback channel 16 performs its original function. If there is no object blocking the aperture 17, the channel 16 communicates with an environment through the aperture 17 and can no longer perform its feedback function.

A conduit 19 connects an oscillating fluid output detector 20 to the other feedback channel 15 through the output port 5. The conduit 19 has a relatively small cross-sectional area, or the detector 20 also has a relatively high input impedance so that the provision of the conduit 19 and the detector 20 may not adversely affect the feedback operation of the feedback channel 15. The detector 20 may comprise a diaphragm valve or bellows, the displacement of which caused by the fluid pressure change may be used as a detection signal.

When there is no object closing the aperture 17, the channel 16 cannot work as it should, as previously mentioned, so that in the interaction chamber 10 the pressure in the right-hand region, as viewed in FIG. 1, between the power stream issuing from the power nozzle 7 and the control nozzle 9 is lower than the pressure in the left-hand region between the power stream and the control nozzle 8. This differential in pressure causes the power stream to be deflected toward the sidewall 14 attaching thereto and entering the output channel 12, only to be discharged out of the aperture 17. Under the condition, there is little or no fluid flowing through the other output channel 11 so that the detector 20 does not operate, that is, no object detection signal is produced.

If an object 18 blocks the aperture 17, however, the channel 16 resumes its feedback function, so that the power stream flowing through the output channel 12 is fed back through the channel 16 as far as the control nozzle 9, from which it is jetted into the chamber 10 as a control stream. This causes the pressure in the right-hand region between the power stream and the control nozzle 9 to become higher than that in the left-hand region between the power stream and the opposite control nozzle 8, thereby shifting the power stream from the output channel 12 to the other output channel 11. Thus, upon closing of the aperture 17 a fluidic oscillation is started in the oscillator 1. Part of the fluid flowing through the channel 11 enters the detector 20 through the conduit 19 to operate the detector to produce an output signal. Thus, the presence or absence of an object can be detected by the presence or absence of the output signal from the detector 20.

FIG. 2 shows another embodiment of the invention. Here and also in FIGS. 3 and 4, the same reference numerals as in FIG. 1 designate the corresponding component parts. In FIG. 2, a time delay tube 21 has its one end connected to the control port 3 and the opposite end closed, and a feedback channel 22 connects the output port 5 to the control port 4. The aperture 17 communicates the feedback channel 22 with an environment, as in FIG. 1. The interaction chamber 10 is of such a configuration that the power stream issuing from the nozzle 7 is normally deflected toward the sidewall 13 to enter the output channel 11.

With the arrangement of FIG. 2, when an object 18 closes the aperture 17, the channel 22 feeds back the fluid flowing through the output channel 11 to the control nozzle 9. The control stream issuing from the nozzle 9 causes the time delay tube 22 to be filled with fluid through the control nozzle 8, so that the interior pressure of the tube increases until a predetermined pressure level is reached, whereupon the power stream can no longer attach to the sidewall 13 but is shifted to the opposite sidewall 14 to be held thereonto and flow into the channel 12. This causes little or no fluid to flow through feedback channel 22 and consequently into the tube 22, so that the interior pressure of the tube decreases to a predetermined level such as no longer to hold the power stream onto the sidewall 14, whereupon the power stream is again shifted back into the output channel 11. The process keeps repeating, shifting the power stream from one of the channels 11 and 12 to the other. Thus, when an object blocks the aperture 17, the oscillator starts oscillation, while if no such object exists, no oscillation is started.

Just as in FIG. 1, the conduit 19 must have as small a cross-sectional area, or the detector 20 must have an input impedance so high that the feedback function of the channel 22 is kept unaffected by the provision of the conduit 19 and the detector 20.

FIG. 3 shows a third embodiment of the invention. The arrangement here is such that the power stream issuing from the power nozzle 7 normally attaches to the sidewall 14 so as to flow into the channel 12. No feedback channel is formed between the output port 5 and the control port 3. When there is no object blocking the aperture 17, the channel 16 cannot perform its feedback function, so that the fluid in the channel 12 flows out through the aperture 17 and cannot be fed back to the control nozzle 9. However, when an object 18 closes the aperture 17, the channel 16 resumes its feedback function, so that the fluid flowing through the channel 12 is fed back through the channel 16 to the control nozzle 9. The control stream thus issuing from the nozzle 9 causes the power stream to shift from the channel 12 to the channel 11, whereupon the channel 16 has no fluid flowing therethrough. Then the power stream is shifted back from the channel 11 again to the channel 12. The process keeps repeating, thereby providing a fluidic oscillation. Thus, the presence of an object blocking the aperture 17 causes oscillation to start in the oscillator. The oscillating fluid output is detected by a detector 20′ connected to the output port 5 through a conduit 19′. Unlike the conduit 19 and the detector 20 in FIGS. 1 and 2, the conduit 19′ and the detector 20′ must have an input impedance relatively low enough to keep the port 5 in a substantially open condition.

In FIG. 2, instead of the detector 20 connected to the port 5, a detector may be connected to the port 6. This detector must have a relatively low input impedance enough to keep the port 6 in an open condition. Also in FIG. 3, in place of the detector 20′ connected to the port 5, a detector may be connected to the port 6. The input impedance of this detector, however, must be high enough to keep the feedback function of the channel 16 unaffected by connection of the detector.

Now turning to FIG. 4, there is shown a device for detecting the punched holes of a card used in various credit sales systems. The device comprises three fluidic oscillators $23_1$, $23_2$ and $23_3$ as shown in FIG. 1 for detecting the punched holes of cards and a single fluidic oscillator 24 for detecting the presence of the card, all oscillators being arranged side-by-side with their object detecting apertures 17 being open at the same side of the device. However, the apertures of the oscillators $23_1$ to $23_3$ are arranged at the same level, with the aperture of the oscillator 24 being positioned at a lower level.

A card 26 is moved alongside the apertures 17 in the direction of an arrow 28. When the forward or upper edge portion of the card first closes the aperture of the oscillator 24, the presence of the card is detected. A common supply pipe 25 connects the supply ports 2 of all the four oscillators $23_1$ to $23_3$ and 24 to a source of fluid, not shown. In the illustrated embodiment the card is formed with several holes 27 arranged in three columns. The width of the card is equal to the total thickness of the four oscillators. The relative arrangement of the apertures 17 and the holes 27 is such that as the card is moved in the direction of the arrow 28, the holes in the left-hand column, as viewed in FIG. 4, face the aperture 17 of the oscillator $23_1$; the holes in the middle column, the aperture of the oscillator $23_2$; and the holes in the right-hand column, the aperture 17 of the oscillator $23_3$. The right-hand margin of the card where no holes are formed covers the aperture 17 of the rightmost oscillator 24. The symbols $S_1$, $S_2$, and $S_3$ and $S_4$ designate the oscillating fluid output signals of the oscillators $23_1$, $23_2$, $23_3$ and 24, respectively.

As the card 26 is moved upward, the aperture 17 of the oscillator 24 is first closed, so that the signal $S_4$ is produced. This signal continues until the lower edge of the card has passed the aperture of the oscillator 24, leaving it open again. During that period, that is, while the signal $S_4$ is present, the holes of the card are detected in the following manner: After the card has blocked the aperture 17 of the oscillator 24, further upward movement of the card causes the apertures 17 of the other three oscillators $23_1$ to $23_3$ to be closed, thereby producing the signals $S_1$ to $S_3$, until the three holes in the uppermost row in the card open the apertures 17 of the three oscillators $23_1$ to $23_3$, whereupon the signals $S_1$ to $S_3$ disappear. As the card is further moved upward, the apertures 17 of the three elements $23_1$ to $23_3$ are again closed, so that the signals $S_1$ to $S_3$ again appear. Then the second hole from above in the left-hand column opens the aperture 17 of the oscillator $23_1$ thereby removing the signal $S_1$, but there is no hole to open the apertures 17 of the other two oscillators $23_2$ and $23_3$ at this time. Consequently, the signals $S_2$ and $S_3$ continue. The process proceeds with the signal $S_4$ always present and the signals $S_1$ to $S_3$ appearing and disappearing as the apertures of the oscillators $23_1$ to $23_3$ are closed or opened, until the lower edge of the card has passed the aperture 17 of the oscillator 24 to open it. In other words, those of the elements $23_1$ to $23_3$ that have their respective apertures 17 opened by a hole in the card have their oscillation stopped, so that the corresponding output signals $S_1$, $S_2$ or $S_3$ disappear until the apertures are closed again. Thus, the holes in the card can be detected by the absence of the signals $S_1$ to $S_3$ under the presence of the signal $S_4$.

The device shown in FIG. 4, may also be used to detect the punched holes in a tape or various flaws such holes or rifts in cloth, paper and the like.

Having illustrated and described preferred embodiments of the invention, it is understood that they are merely representative and that there are many changes and modifications within the scope of the invention as defined in the appended claims.

We claim:

1. A device for detecting the holes present in an object such as a punched card comprising:

a. a plurality of fluidic oscillators, each of said oscillators including a feedback channel, an object-detecting aperture communicating said feedback channel with an environment and adapted to be closed by an object to be detected so as to have the feedback function of said feedback channel restored, a conduit adapted for an oscillating fluid output signal to be taken therefrom when the oscillating condition of said oscillator has been changed upon restoration of said feedback function, and means connected to said conduit which are operable in response to said oscillating fluid output signal to produce a corresponding output signal;

b. said plurality of oscillators being so arranged that said object-detecting apertures thereof are all arranged on a side of the device facing the object; and c. said object-detecting aperture in one of said oscillators being disposed therein so that it is advanced with respect to the remaining of said object object-detecting apertures in the direction of movement of the object along said side so that the corresponding oscillator first produces an output signal during object movement.

2. The device as recited in claim 1, wherein each of said oscillators includes:

a. a power nozzle;

b. an interaction chamber into which a power stream issues from said power nozzle;

c. a pair of output channels downstream of said chamber for said power stream to selectively flow into, and a pair of output ports, each of said output channels terminating in one of said output ports, said interaction chamber being so configured that normally said power stream flows into a predetermined one of said output channels, d. a pair of control nozzles open toward said interaction chamber; and e. wherein said feedback channel connects the output port of said predetermined output channel to one of said control nozzles so that the control stream therefrom causes part of the fluid of said power stream to flow into the other of said control nozzles.

3. The device as recited in claim 2, further comprising a dead ended time delay tube which is connected to the other of said control nozzles.